(12) United States Patent
    Schindler

(10) Patent No.: US 11,795,274 B2
(45) Date of Patent: Oct. 24, 2023

(54) CROSSLINKABLE COMPOSITIONS BASED ON ORGANOPOLYSILOXANES HAVING ORGANYLOXY GROUPS

(71) Applicant: WACKER CHEMIE AG, Munich (DE)

(72) Inventor: Wolfram Schindler, Tuessling (DE)

(73) Assignee: Wacker Chemie AG, Munich (DE)

( * ) Notice: Subject to any disclaimer, the term of this patent is extended or adjusted under 35 U.S.C. 154(b) by 422 days.

(21) Appl. No.: 17/058,196

(22) PCT Filed: Jun. 1, 2018

(86) PCT No.: PCT/EP2018/064471
§ 371 (c)(1),
(2) Date: Nov. 24, 2020

(87) PCT Pub. No.: WO2019/228643
PCT Pub. Date: Dec. 5, 2019

(65) Prior Publication Data
US 2021/0189071 A1    Jun. 24, 2021

(51) Int. Cl.
    C08G 77/18    (2006.01)
    C08G 77/20    (2006.01)
    C08G 77/26    (2006.01)
    C08L 83/04    (2006.01)

(52) U.S. Cl.
    CPC .............. *C08G 77/18* (2013.01); *C08G 77/20* (2013.01); *C08G 77/26* (2013.01); *C08L 83/04* (2013.01); *C08G 2150/00* (2013.01); *C08L 2312/08* (2013.01)

(58) Field of Classification Search
    CPC ........... C08G 77/18; C07F 7/18; C08K 5/544; C09D 183/00
    See application file for complete search history.

(56) References Cited

U.S. PATENT DOCUMENTS

| 5,728,794 A | 3/1998 | Friebe et al. |
| 6,531,621 B1 | 3/2003 | Dorsch et al. |
| 2004/0266967 A1* | 12/2004 | Ziche ................ C08L 83/04 528/34 |
| 2007/0282060 A1 | 12/2007 | Scholey et al. |

FOREIGN PATENT DOCUMENTS

| EP | 0763557 A1 | 3/1997 |
| EP | 1042400 B1 | 12/2001 |
| EP | 1436351 B1 | 6/2005 |
| EP | 1865029 A2 | 12/2007 |
| WO | 9932551 A1 | 7/1999 |

* cited by examiner

*Primary Examiner* — Kuo Liang Peng
(74) *Attorney, Agent, or Firm* — Brooks Kushman P.C.

(57) ABSTRACT

Crosslinkable compositions based on organopolysiloxanes containing organyloxy groups may have low viscosities and self-leveling properties, and contain
(A) organopolysiloxanes containing organyloxy groups of the formula (I)

$$R_a R^1_b (OR^2)_c SiO_{(4-a-b-c)/2} \qquad (I),$$

(B) organosilicon compounds of the formula (II)

$$(R^4O)_d SiR^3_{(4-d)} \qquad (II),$$

and/or their partial hydrolysates,
(C) organosilicon compounds containing basic nitrogen of the formula (III)

$$(R^6O)_e SiR^5_{(4-e)} \qquad (III),$$

and/or their partial hydrolysates, and
(D) organosilicon compounds of the formula (IV)

$$(R^8O)_h SiR^7_{(4-h)} \qquad (IV)$$

and/or their partial hydrolysates.

16 Claims, No Drawings

CROSSLINKABLE COMPOSITIONS BASED ON ORGANOPOLYSILOXANES HAVING ORGANYLOXY GROUPS

CROSS REFERENCE TO RELATED APPLICATIONS

This application is the U.S. National Phase of PCT Appln. No. PCT/EP2018/064471 filed Jun. 1, 2018, the disclosure of which is incorporated in its entirety by reference herein.

BACKGROUND OF THE INVENTION

1. Field of the Invention

The invention relates to crosslinkable compositions based on organopolysiloxanes containing organyloxy groups, especially having low viscosities, including those having self-leveling properties, to methods for producing them, and to their use, particularly as coatings or as a liquid-applied membrane.

2. Description of the Related Art

One-component (RTV-1) sealants which are storable with exclusion of water but undergo vulcanization to elastomers when water is admitted, have been known for a long time. These products are employed in large quantities, for example, in the construction industry, as sealants for connecting joints or façade joints, or can be applied as elastic coatings. These mixtures are based on polymers terminated with silyl groups which carry reactive substituents such as OH groups or hydrolyzable groups such as alkoxy groups, for example. Furthermore, these sealants may comprise fillers, plasticizers, crosslinkers, catalysts, and additives. Reference may be made in this regard, for example, to EP-A 763557, EP-A 1865029 and EP-A 1042400. Alkoxy-RTV-1 compositions are preferred on account of their neutral and odorless crosslinking and the very good adhesion to different substrates, relative to other neutral systems. Such alkoxy-RTV-1 compositions are of interest not only for pastelike sealants but also as reactive coating material. These formulations must usually be spreadable by means of brush and roller or sprayable, for example, via airless spray. The challenge here is to combine good processing qualities and viscosities with the assurance of robust curing and sufficient mechanical properties. The simplest way to adjust the viscosity is to add solvents. Solvents, however, are unwanted on account of their flammability or else as VOCs. Low-viscosity polymers usually result in brittle, fragile compositions or must be compensated by using reinforcing fillers with rheological activity. A compromise would be reactive diluents—such as functional alkoxysilanes, for example—these, however, generally influence the curing very sharply or lead also to an embrittlement of the vulcanisate.

The object, then, was to provide crosslinkable compositions, based on organopolysiloxanes containing organyloxy groups, with which it is possible to realize extremely low and easily-adjusted viscosities at the same time as robust curing and good mechanical properties, without any need to use solvents or nonreactive plasticizers.

SUMMARY OF THE INVENTION

Crosslinkable compositions with low and easily adjusted viscosities and good cured mechanical properties contain an alkoxy-functional organopolysiloxane, an at least dialkoxysilane or partial hydrolysate thereof, an alkoxysilane also containing basic nitrogen or partial hydrolysate thereof, and an alkoxysilane bearing at least one long chain alkyl group or partial hydrolysate thereof.

DETAILED DESCRIPTION OF THE PREFERRED EMBODIMENTS

A subject of the invention are crosslinkable compositions comprising
(A) Organopolysiloxanes containing organyloxy groups and composed of units of the formula (I)

$$R_a R^1_b (OR^2)_c SiO_{(4-a-b-c)/2} \quad (I),$$

where
R may be identical or different and represents monovalent, SiC-bonded, optionally substituted hydrocarbyl radicals that are free from aliphatic carbon-carbon multiple bonds,
$R^1$ may be identical or different and denotes monovalent, SiC-bonded, optionally substituted hydrocarbyl radicals having aliphatic carbon-carbon multiple bonds,
$R^2$ may be identical or different and denotes monovalent, optionally substituted hydrocarbyl radicals, which may be interrupted by oxygen atoms,
a is 0, 1, 2 or 3,
b is 0 or 1, and
c is 0, 1, 2 or 3,
with the proviso that in formula (I) the sum $a+b+c \leq 3$ and c is other than 0 in at least one unit,
(B) organosilicon compounds of the formula (II)

$$(R^4O)_d SiR^3_{(4-d)} \quad (II),$$

where
$R^3$ may be identical or different and denotes monovalent, SiC-bonded, aliphatic hydrocarbyl radicals having 1 to 7 carbon atoms that are optionally substituted by ether groups, ester groups, (poly) glycol radicals or triorganyloxysilyl groups, or aromatic radicals,
$R^4$ may be identical or different and denotes hydrogen atom or monovalent, optionally substituted hydrocarbyl radicals, which may be interrupted by oxygen atoms,
d is 2, 3 or 4, preferably 3 or 4, more preferably 3, and/or their partial hydrolysates,
(C) organosilicon compounds containing basic nitrogen and of the formula (III)

$$(R^6O)_e SiR^5_{(4-e)} \quad (III),$$

where
$R^5$ may be identical or different and denotes monovalent, SiC-bonded radicals containing basic nitrogen,
$R^6$ may be identical or different and denotes hydrogen atom or monovalent, optionally substituted hydrocarbyl radicals, which may be interrupted by oxygen atoms,
e is 2 or 3, preferably 3,
and/or their partial hydrolysates
and
(D) organosilicon compounds of the formula (IV)

$$(R^8O)_h SiR^7_{(4-h)} \quad (IV),$$

where
$R^7$ may be identical or different and denotes monovalent, SiC-bonded, aliphatic hydrocarbyl radicals optionally substituted by ether groups, ester groups, (poly)glycol radicals or triorganyloxysilyl groups and having at least 8 carbon atoms, $R^8$ may be identical or different and denotes hydrogen atom or monovalent, optionally substituted hydrocarbyl radicals which may be interrupted by oxygen atoms, h is 2 or 3, preferably 3 and/or their partial hydrolysates.

In the context of the present invention, the term "organopolysiloxanes" is intended to encompass polymeric, oligomeric, and dimeric siloxanes.

The crosslinkable compositions are preferably compositions which can be crosslinked by condensation reactions.

In the context of the present invention, the designation "condensation reaction" is intended also to encompass any preceding hydrolysis step.

Examples of radicals R are alkyl radicals such as the methyl, ethyl, n-propyl, isopropyl, 1-n-butyl, 2-n-butyl, isobutyl, tert-butyl, n-pentyl, isopentyl, neopentyl, and tert-pentyl radicals; hexyl radicals such as the n-hexyl radical; heptyl radicals such as the n-heptyl radical; octyl radicals such as the n-octyl radical and isooctyl radicals such as the 2,2,4-trimethylpentyl radical; nonyl radicals such as the n-nonyl radical; decyl radicals such as the n-decyl radical; dodecyl radicals such as the n-dodecyl radical; octadecyl radicals such as the n-octadecyl radical; cycloalkyl radicals, such as the cyclopentyl, cyclohexyl, cycloheptyl radical and methylcyclohexyl radicals; aryl radicals such as the phenyl, naphthyl, anthryl, and phenanthryl radicals; alkaryl radicals such as o-, m-, and p-tolyl radicals, xylyl radicals and ethylphenyl radicals; and aralkyl radicals such as the benzyl radical and the α- and the β-phenylethyl radicals.

Examples of substituted radicals R are methoxyethyl, ethoxyethyl, and ethoxyethoxyethyl radicals or polyoxyalkyl radicals such as polyethylene glycol or polypropylene glycol radicals.

Radical R preferably comprises monovalent hydrocarbyl radicals having 1 to 18 carbon atoms that are free from aliphatic carbon-carbon multiple bonds and that are optionally substituted by halogen atoms, amino groups, ether groups, ester groups, epoxy groups, mercapto groups, cyano groups or (poly)glycol radicals, and more preferably comprises monovalent hydrocarbyl radicals having 1 to 12 carbon atoms that are free from aliphatic carbon-carbon multiple bonds, and most preferably the methyl radical.

Examples of radicals $R^1$ are alkenyl radicals such as linear or branched 1-alkenyl radicals such as the vinyl radical and 1-propenyl radical and also the 2-propenyl radical.

Radical $R^1$ preferably comprises monovalent hydrocarbyl radicals having 1 to 18 carbon atoms that have aliphatic carbon-carbon multiple bonds and that are optionally substituted by halogen atoms, amino groups, ether groups, ester groups, epoxy groups, mercapto groups, cyano groups or (poly)glycol radicals, and more preferably comprises monovalent hydrocarbyl radicals having 1 to 12 carbon atoms and having aliphatic carbon-carbon multiple bonds, and more particularly the vinyl radical.

Examples of radicals $R^2$ are the monovalent radicals stated for R and $R^1$.

Radical $R^2$ preferably comprises monovalent, optionally substituted hydrocarbyl radicals having 1 to 12 carbon atoms that may be interrupted by oxygen atoms, and more preferably comprises alkyl radicals having 1 to 6 carbon atoms, and most preferably the methyl or ethyl radical, and especially the methyl radical.

Organopolysiloxanes (A) used in accordance with the invention are preferably composed of units of the formula (I) with at least one unit in which b and c are other than 0.

Organopolysiloxanes (A) used in accordance with the invention are preferably substantially linear, organyloxy-terminated organopolysiloxanes, more preferably those of the formula (V)

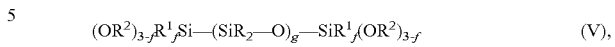

(V), where

R, $R^1$, and $R^2$ may each be identical or different, and have one of the definitions stated above, g is 30 to 5000, and f is 0, 1 or 2, preferably 1, with the proviso that in formula (V) f is other than 0 in at least one unit.

Although not specified in formula (V), the organopolysiloxanes (A) of the formula (V) that are used in accordance with the invention may contain, resulting from their preparation, a small proportion of branching, preferably up to a maximum of 500 ppm of all the Si units, and most preferably no branching.

Although not specified in the formulae (I) and (V), the organopolysiloxanes (A) used in accordance with the invention may contain, resulting from their preparation, a small proportion of hydroxyl groups, preferably up to a maximum of 5% of all Si-bonded radicals.

Preferred examples of organopolysiloxanes (A) are
$(MeO)_2MeSiO[SiMe_2O]_{200-2000}SiMe(OMe)_2$,
$(MeO)_2MeSiO[SiMe_2O]_{200-2000}SiVi(OMe)_2$,
$(MeO)_2ViSiO[SiMe_2O]_{200-2000}SiVi(OMe)_2$,
$(MeO)_2MeSiO[SiMe_2O]_{200-2000}SiViMe(OMe)$,
$(MeO)ViMeSiO[SiMe_2O]_{200-2000}SiViMe$ (OMe) or
(MeO) $ViMeSiO[SiMe_2O]_{200-2000}SiVi(OMe)_2$, where
$(MeO)_2MeSiO[SiMe_2O]_{200-2000}SiVi(OMe)_2$ or
$(MeO)_2ViSiO[SiMe_2O]_{200-2000}SiVi(OMe)_2$ are more preferred, most preferably $(MeO)_2ViSiO[SiMe_2O]_{200-2000}SiVi(OMe)_2$.

The organopolysiloxanes (A) used in accordance with the invention preferably have a viscosity of 1000 to $10^6$ mPas, more preferably 1000 to $10^3$ mPas, especially 1000 to 50 000 mPas, in each case at 25° C.

The organopolysiloxanes (A) are commercially customary products and/or can be prepared and isolated by methods commonplace within silicon chemistry, prior to blending.

Examples of radicals $R^3$ are the monovalent radicals stated for R and $R^1$.

Radical $R^3$ preferably comprises monovalent aliphatic hydrocarbyl radicals having 1 to 7 carbon atoms that are optionally substituted by ether groups, ester groups, (poly) glycol radicals or triorganyloxysilyl groups or aromatic hydrocarbyl radicals optionally substituted by ether groups, ester groups, (poly)glycol radicals or triorganyloxysilyl groups, and more preferably comprises alkyl radicals having 1 to 7 carbon atoms or alkenyl radicals having 1 to 7 carbon atoms or aromatic hydrocarbyl radicals, and most preferably comprises the methyl radical and the vinyl radical.

Examples of radicals $R^4$ are hydrogen and the monovalent radicals stated for R and $R^1$.

Radical $R^4$ preferably comprises monovalent, optionally substituted hydrocarbyl radicals having 1 to 12 carbon atoms, that may be interrupted by oxygen atoms, and more preferably comprises alkyl radicals having 1 to 6 carbon atoms, most preferably the methyl or ethyl radical, and especially the ethyl radical.

The organosilicon compounds (B) used in the compositions of the invention are preferably silanes having at least one methoxy or ethoxy radical and/or their partial hydrolysates, more preferably tetraethoxysilane, methyltrimethoxysilane, methyltriethoxysilane, vinyltrimethoxysilane, vinyltriethoxysilane, vinylmethyldimethoxysilane, vinylmethyldiethoxysilane, phenyltrimethoxysilane, phenyltriethoxysilane or 1,2-bis(triethoxysilyl)ethane and/or their partial hydrolysates, yet more preferablytetraethoxysilane, methyltrimethoxysilane, vinyltrimethoxysilane or vinyltriethoxysilane and/or their partial hydrolysates, still more preferably methyltrimethoxysilane, vinyltrimethoxysilane or vinyltriethoxysilane and/or their partial hydrolysates, and especially vinyltriethoxysilane and/or its partial hydrolysates.

The partial hydrolysates (B) may be partial homohydrolysates, i.e., partial hydrolysates of one kind of organosilicon compound of the formula (II), and also partial cohydrolysates, i.e., partial hydrolysates of at least two different kinds of organosilicon compounds of the formula (II).

Where the compounds (B) used in the compositions of the invention are partial hydrolysates of organosilicon compounds of the formula (II), those having up to ten silicon atoms are preferred.

The crosslinkers (B) used optionally in the compositions of the invention are commercially customary products and/or can be prepared by methods that are known within silicon chemistry.

The compositions of the invention preferably comprise component (B) in amounts of 0.5 to 15.0 parts by weight, more preferably 0.5 to 10.0 parts by weight, most preferably 1.0 to 5.0 parts by weight, based in each case on 100 parts by weight of organopolysiloxanes (A).

Examples of radicals $R^5$ are radicals of the formulae $H_2NCH_2-$, $H_2N(CH_2)_2-$, $H_2N(CH_2)_3-$, $H_2N(CH_2)_2NH(CH_2)_2-$, $H_2N(CH_2)_2NH(CH_2)_3-$, $H_2N(CH_2)_2NH(CH_2)_2NH(CH_2)_3-$, $H_3CNH(CH_2)_3-$, $C_2H_5NH(CH_2)_3-$, $H_3CNH(CH_2)_2-$, $C_2H_5NH(CH_2)_2-$, $H_2N(CH_2)_4-$, $H_2N(CH_2)_5-$, $H(NHCH_2CH_2)_3-$, $C_4H_9NH(CH_2)_2NH(CH_2)_2-$, cyclo-$C_6H_{11}NH(CH_2)_3-$, cyclo-$C_6H_{11}NH(CH_2)_2-$, $(CH_3)_2N(CH_2)_3-$, $(CH_3)_2N(CH_2)_2-$, $(C_2H_5)_2N(CH_2)_3-$ and $(C_2H_5)_2N(CH_2)_2-$.

Radical $R^5$ preferably comprises $H_2N(CH_2)_3-$, $H_2N(CH_2)_2NH(CH_2)_3-$, $H_3CNH(CH_2)_3-$, $C_2H_5NH(CH_2)_3-$ or cyclo-$C_6H_{11}NH(CH_2)_3-$ radical, most preferably the $H_2N(CH_2)_2NH(CH_2)_3-$ radical.

Examples of radical $R^6$ are hydrogen and also the examples stated for radical $R^2$.

Radical $R^6$ preferably comprises monovalent, optionally substituted hydrocarbyl radicals having 1 to 12 carbon atoms, that may be interrupted by oxygen atoms, and more preferably comprises alkyl radicals having 1 to 6 carbon atoms, and most preferably the methyl or ethyl radical.

The organosilicon compounds (C) are preferably 3-aminopropyltrimethoxysilane, 3-aminopropyltriethoxysilane, 3-aminopropylmethyldimethoxysilane, 3-aminopropylmethyldiethoxysilane, N-(2-aminoethyl)-3-aminopropyltrimethoxysilane, N-(2-aminoethyl)-3-aminopropyltriethoxysilane, N-(2-aminoethyl)-3-aminopropylmethyldimethoxysilane, N-phenyl-3-aminopropyltrimethoxysilane, N-phenyl-3-aminopropylmethyldimethoxysilane, N-phenyl-3-aminopropyltriethoxysilane or N-phenyl-3-aminopropylmethyldiethoxysilane, or further N-alkyl or N,N-dialkyl derivatives of 3-aminopropyltrimethoxysilane, 3-aminopropyltriethoxysilane, 3-aminopropylmethyldimethoxysilane or 3-aminopropylmethyldiethoxysilane or their partial hydrolysates, where the stated N-alkyl radicals are preferably methyl, ethyl, n-propyl, isopropyl, n-butyl, isobutyl, tert-butyl, cyclohexyl or the various branched or unbranched pentyl or hexyl radicals.

The compounds (C) are more preferably 3-aminopropyltrimethoxysilane, 3-aminopropyltriethoxysilane, N-(2-aminoethyl)-3-aminopropyltrimethoxysilane or N-(2-aminoethyl)-3-aminopropyltriethoxysilane, most preferably N-(2-aminoethyl)-3-aminopropyltrimethoxysilane or N-(2-aminoethyl)-3-aminopropyltriethoxysilane.

The compounds (C) used in the compositions of the invention are commercially customary products and/or can be prepared by methods that are known within silicon chemistry.

The compositions of the invention preferably comprise component (C) in amounts of 0.5 to 15.0 parts by weight, more preferably 0.5 to 10.0 parts by weight, most preferably 0.5 to 5.0 parts by weight, based in each case on 100 parts by weight of organopolysiloxanes (A).

In the compositions of the invention, the weight ratio of component (B) to component (C) is preferably in the range from 2:1 to 1:2, more preferably in the range from 3:2 to 2:3.

Examples of radicals $R^7$ are the monovalent aliphatic radicals specified for R and $R^1$ with at least 8 carbon atoms.

Radical $R^7$ preferably comprises monovalent aliphatic hydrocarbyl radicals optionally substituted by ether groups, ester groups, (poly)glycol radicals or triorganyloxysilyl groups and having at least 8 carbon atoms, and more preferably comprises monovalent aliphatic hydrocarbyl radicals optionally substituted by ether groups, ester groups (poly)glycol radicals or triorganyloxysilyl groups and having 8 to 18 carbon atoms, and yet more preferably comprises aliphatic hydrocarbyl radicals having 8 to 16 carbon atoms, and especially comprises alkyl radicals having 8 to 16 carbon atoms.

Examples of radicals $R^8$ are hydrogen and the monovalent radicals stated for R and $R^1$.

Radical $R^8$ preferably comprises monovalent, optionally substituted hydrocarbyl radicals having 1 to 12 carbon atoms, that may be interrupted by oxygen atoms, and more preferably comprises alkyl radicals having 1 to 6 carbon atoms, most preferably the methyl or ethyl radical, and especially the ethyl radical.

Organosilicon compound (D) preferably has at least one radical $R^8$ having at least two carbon atoms.

The organosilicon compounds (D) used in the compositions of the invention are preferably hexadecyltrimethoxysilane, hexadecyltriethoxysilane, n-octyltrimethoxysilane, n-octyltriethoxysilane, isooctyltrimethoxysilane or isooctyltriethoxysilane and/or their partial hydrolysates, more preferably n-octyltriethoxysilane or isooctyltriethoxysilane.

The partial hydrolysates (D) may be partial homohydrolysates, i.e., partial hydrolysates of one kind of organosilicon compound of the formula (IV), and also partial cohydrolysates, i.e., partial hydrolysates of at least two different kinds of organosilicon compounds of the formula (IV).

Where the compounds (D) used in the compositions of the invention are partial hydrolysates of organosilicon compounds of the formula (IV), those having up to ten silicon atoms are preferred.

The compounds (D) optionally used in the compositions of the invention are commercially customary products and/or can be prepared by methods that are known within silicon chemistry.

The compositions of the invention preferably comprise component (D) in amounts of 5 to 100 parts by weight, more preferably 10 to 80 parts by weight, most preferably 20 to 50 parts by weight, based in each case on 100 parts by weight of organopolysiloxanes (A).

In addition to the components (A), (B), (C) and (D), the compositions of the invention may also comprise all further substances which have also been employed to date in compositions which can be crosslinked by condensation reaction; examples of such further substances include (E) fillers, (F) catalysts, (G) stabilizers, (H) additives and (J) plasticizers.

Examples of fillers (E) are nonreinforcing fillers, these being fillers having a BET surface area of up to 50 m$^2$/g, such as uncoated calcium carbonates, coated calcium carbonates, quartz, diatomaceous earth, calcium silicate, zirconium silicate, zeolites, metal oxide powders such as aluminum, titanium, iron or zinc oxides and/or their mixed oxides, barium sulfate, gypsum, silicon nitride, silicon carbide, boron nitride, or glass powders and polymeric powders such as polyacrylonitrile powders. Examples of reinforcing fillers, these being fillers having a BET surface area of more than 50 m$^2$/g, are pyrogenically produced silica, precipitated silica, carbon blacks such as furnace black and acetylene black, and mixed silicon-aluminum oxides of high BET surface area. It is also possible, furthermore, to use fibrous fillers such as asbestos, or polymeric fibers. The stated fillers may have been hydrophobized, by treatment, for example, with organosilanes and/or organosiloxanes, stearic acid derivative, or by etherification of hydroxyl groups to alkoxy groups.

If fillers (E) are used, they are preferably untreated calcium carbonates, hydrophilic, pyrogenically produced silica, or hydrophobic, pyrogenically produced silica.

If the compositions of the invention do include fillers (E), the amounts are preferably 10 to 500 parts by weight, more preferably 10 to 200 parts by weight, most preferably 50 to 200 parts by weight, based in each case on 100 parts by weight of organopolysiloxane (A).

As catalyst (F) it is possible to use all curing accelerators which have also been employed to date in compositions which can be crosslinked by condensation reaction. Examples of optionally employed catalysts (F) are organotin compounds such as di-n-butyltin dilaurate and di-n-butyltin diacetate, di-n-butyltin oxide, dioctyltin diacetate, dioctyltin dilaurate, dioctyltin oxide, and also reaction products of these compounds with alkoxysilanes, and organo-functional alkoxysilanes such as tetraethoxysilane and aminopropyltriethoxysilane; preferred are di-n-butyltin dilaurate, dioctyltin dilaurate, reaction products of dibutyltin oxide and dioctyltin oxide with tetraethyl silicate hydrolysate or mixed hydrolysates with aminopropylsilanes, especially di-n-butyltin oxide in tetraethyl silicate hydrolysate.

If the compositions of the invention do include catalysts (F), which is preferred, the amounts are preferably 0.01 to 3 parts by weight, more preferably 0.05 to 2 parts by weight, based in each case on 100 parts by weight of organopolysiloxane (A).

Preferred examples of stabilizers (G) are phosphoric acid, phosphonic acids, phosphonic acid alkyl esters, and phosphoric acid alkyl esters.

If the compositions of the invention do include stabilizers (G), which is preferred, the amounts are preferably 0.01 to 100 parts by weight, more preferably 0.1 to 30 parts by weight, more particularly 0.3 to 10 parts by weight, based in each case on 100 parts by weight of organopolysiloxane (A).

Examples of additives (H) are pigments, dyes, odorants, oxidation inhibitors, agents for influencing the electrical properties such as conductive carbon black, flame retardants, light stabilizers, fungicides, heat stabilizers, scavengers, such as Si—N-containing silazanes or silylamides, cocatalysts, thixotropic agents, such as, for example, polyethylene glycols, polypropylene glycols or copolymers thereof, organic solvents, such as alkyl aromatics, paraffin oils, and also any desired siloxanes different from component (A).

With preference no organic solvents (H) are used for producing the compositions of the invention.

If the compositions of the invention do include additives (H), the amounts are preferably 0.01 to 100 parts by weight, more preferably 0.1 to 30 parts by weight, most preferably 0.3 to 10 parts by weight, based in each case on 100 parts by weight of organopolysiloxane (A).

Examples of optionally employed plasticizers (J) are dimethylpolysiloxanes which are liquid at room temperature under a pressure of 1013 hPa and are terminated with trimethylsiloxy groups, in particular having viscosities at 25° C. in the range between 20 and 5000 mPas; organopolysiloxanes which are liquid at room temperature under a pressure of 1013 hPa and consist substantially of $SiO_{3/2}$, $SiO_{2/2}$, and $SiO_{1/2}$ units, referred to as T, D, and M units; and also high-boiling hydrocarbons, such as, for example, paraffin oils or mineral oils consisting substantially of naphthenic and paraffinic units.

The optionally employed plasticizer (J) preferably comprises linear polydimethylsiloxanes having trimethylsilyl end groups If the compositions of the invention do include plasticizers (J), the amounts are preferably 10 to 300 parts by weight, more preferably 10 to 1500 parts by weight, most preferably 10 to 50 parts by weight, based in each case on 100 parts by weight of organopolysiloxane (A). Preferably, the compositions of the invention do not include any plasticizers (J).

The compositions of the invention are preferably compositions comprising
- (A) organopolysiloxanes composed of units of the formula (I),
- (B) organosilicon compounds of the formula (II) having at least one methyl or ethyl radical $R^4$ and/or their partial hydrolysates,
- (C) organosilicon compounds containing basic nitrogen and of the formula (III) and/or their partial hydrolysates,
- (D) organosilicon compounds of the formula (IV) having at least one ethyl radical $R^8$ and/or their partial hydrolysates,
- optionally (E) fillers,
- optionally (F) catalysts,
- optionally (G) stabilizers,
- optionally (H) additives and
- optionally (J) plasticizers.

The compositions of the invention are more preferably compositions comprising
- (A) organopolysiloxanes composed of units of the formula (I) with at least one unit in which b and c are other than 0,
- (B) organosilicon compounds of the formula (II) having at least one methyl or ethyl radical $R^4$ and/or their partial hydrolysates,
- (C) organosilicon compounds containing basic nitrogen and of the formula (III) and/or their partial hydrolysates,
- (D) organosilicon compounds of the formula (IV) having at least one ethyl radical $R^8$ and/or their partial hydrolysates,
- optionally (E) fillers,
- optionally (F) catalysts,
- optionally (G) stabilizers,
- optionally (H) additives and
- optionally (J) plasticizers.

The compositions of the invention are yet more preferably compositions comprising
(A) organopolysiloxanes of the formula (V) where $R^1$ is vinyl radical,
(B) organosilicon compounds of the formula (II) having at least one methyl or ethyl radical $R^4$ and/or their partial hydrolysates,
(C) organosilicon compounds containing basic nitrogen and of the formula (III) selected from N-(2-aminoethyl)-3-aminopropyltrimethoxysilane and N-(2-aminoethyl)-3-aminopropyltriethoxysilane, and their partial hydrolysates,
(D) organosilicon compounds of the formula (IV) having an alkyl radical $R^7$ having 8 to 16 carbon atoms and at least one ethyl radical $R^8$ and/or their partial hydrolysates,
optionally (E) fillers,
optionally (F) catalysts,
(G) stabilizers,
optionally (H) additives and
(J) plasticizers,
with the proviso that the weight ratio of component (B) to component (C) is preferably in the range from 2:1 to 1:2.

The compositions of the invention are still more preferably compositions comprising
(A) organopolysiloxanes selected from the compounds
(MeO)$_2$MeSiO[SiMe$_2$O]$_{200-2000}$SiVi(OMe)$_2$
(MeO)$_2$ViSiO[SiMe$_2$O]$_{200-2000}$SiVi(OMe)$_2$,
(MeO)$_2$MeSiO[SiMe$_2$O]$_{200-2000}$ SiViMe(OMe),
(MeO)ViMeSiO[SiMe$_2$O]$_{200-2000}$ SiViMe(OMe) and
(MeO)ViMeSiO [SiMe$_2$O]$_{200-2000}$SiVi(OMe)$_2$,
(B) organosilicon compounds selected from the compounds tetraethoxysilane, methyltrimethoxysilane, methyltriethoxysilane, vinyltrimethoxysilane, vinyltriethoxysilane, vinylmethyldimethoxysilane, vinylmethyldiethoxysilane, phenyltrimethoxysilane, phenyltriethoxysilane and 1,2-bis(triethoxysilyl)ethane or their partial hydrolysates,
(C) organosilicon compounds containing basic nitrogen and selected from N-(2-aminoethyl)-3-aminopropyltrimethoxysilane and N-(2-aminoethyl)-3-aminopropyltriethoxysilane, and their partial hydrolysates,
(D) organosilicon compounds of the formula (IV) having an alkyl radical $R^7$ having 8 to 16 carbon atoms and an ethyl radical $R^8$ and/or their partial hydrolysates,
optionally (E) fillers,
(F) catalysts,
(G) stabilizers,
optionally (H) additives and
(J) plasticizers,
with the proviso that the weight ratio of component (B) to component (C) is preferably in the range from 2:1 to 1:2.

In a further, more particularly preferred embodiment, the compositions of the invention are compositions comprising
(A) organopolysiloxanes selected from the compounds
(MeO)$_2$MeSiO[SiMe$_2$O]$_{200-2000}$ SiVi(OMe)$_2$ and
(MeO)$_2$ViSiO[SiMe$_2$O]$_{200-2000}$SiVi (OMe)$_2$,
(B) organosilicon compounds selected from the compounds tetraethoxysilane, methyltrimethoxysilane, vinyltrimethoxysilane and vinyltriethoxysilane, and also their partial hydrolysates,
(C) organosilicon compounds containing basic nitrogen and selected from N-(2-aminoethyl)-3-aminopropyltrimethoxysilane and N-(2-aminoethyl)-3-aminopropyltriethoxysilane, and their partial hydrolysates,
(D) organosilicon compounds of the formula (IV) having an alkyl radical $R^7$ having 8 to 16 carbon atoms and an ethyl radical $R^8$ and/or their partial hydrolysates,
optionally (E) fillers,
(F) catalysts,
(G) stabilizers,
optionally (H) additives and
(J) plasticizers,
with the proviso that the weight ratio of component (B) to component (C) is preferably in the range from 2:1 to 1:2.

In another very particularly preferred embodiment, the compositions of the invention are compositions comprising
(A) (MeO)$_2$ViSiO[SiMe$_2$O]$_{200-2000}$SiVi (OMe)$_2$,
(B) vinyltriethoxysilane and/or its partial hydrolysates,
(C) organosilicon compounds containing basic nitrogen and selected from N-(2-aminoethyl)-3-aminopropyltrimethoxysilane and N-(2-aminoethyl)-3-aminopropyltriethoxysilane, and their partial hydrolysates,
(D) organosilicon compounds of the formula (IV) having an n-octyl or isooctyl radical $R^7$ and an ethyl radical $R^8$, and/or their partial hydrolysates,
optionally (E) fillers,
(F) catalysts,
(G) stabilizers,
optionally (H) additives and
(J) plasticizers,
with the proviso that the weight ratio of component (B) to component (C) is preferably in the range from 3:2 to 2:3.

The compositions of the invention preferably contain no further constituents beyond the components (A) to (J).

The compositions of the invention preferably comprise organic solvents in amounts of not more than 10 parts by weight, based on the total weight of the composition, and more preferably none.

If the compositions of the invention do include small amounts of organic solvents, those involved are preferably alcohols which form in the hydrolysis and/or condensation reaction.

The individual constituents of the compositions of the invention may in each case comprise one kind of such a constituent or else a mixture of at least two different kinds of such constituents.

The compositions of the invention comprise a liquid or viscous mixture, and preferably are low-viscosity compositions.

The compositions of the invention preferably have viscosities of less than 50,000 mPas, more preferably less than 25,000 mPas, and most preferably less than 15,000 mPas, measured in each case according to DIN EN ISO 3219 using a plate/cone system at 25° C. and a shear rate of 25 l/s.

The compositions of the invention may be prepared by mixing all of the constituents with one another in any order.

A further subject of the present invention is a method for producing the compositions of the invention by mixing the individual components in any order.

This mixing may take at room temperature under the pressure of the surrounding atmosphere, in other words about 900 to 1100 hPa. If desired, however, this mixing may also take place at higher temperatures, as for example at temperatures in the range from 35 to 100° C. It is possible, moreover, to carry out mixing occasionally or continuously under reduced pressure, such as at absolute pressure of 30 to 500 hPa, for example, in order to remove volatile compounds or air.

Preferably, the components (A), (B), (C), (D) and optionally plasticizer (J), preferably a trimethylsilyl-terminated organopolysiloxane, are mixed. This may occur under the pressure of the atmosphere or else under reduced pressure. Subsequently it is possible to mix in fillers (E) and to carry out dispersing in the mixer with relatively strong shearing at relatively high rotary speeds. This is generally done under reduced pressure in order to remove volatile compounds, air, and reaction products of the moisture of the fillers with components (B) and (C). Further constituents, such as stabilizers (G) or additives (H), may be added before or together with the fillers (E). If catalyst (F) is used, it is stirred in homogeneously at the end. This is generally done under reduced pressure, in order to make the liquid or low-viscosity compositions bubble-free.

The customary water content of the air is sufficient to crosslink the compositions of the invention. Crosslinking of the compositions of the invention is accomplished preferably at room temperature. It may, if desired, also be carried out at temperatures higher or lower than room temperature, as for example at −20° to 15° C. or at 30° C. to 60° C., and/or by means of concentrations of water that exceed the normal water content of the air. The direct admixing of water or hydrous substances is also possible.

The crosslinking is preferably carried out at a pressure of 100 to 1100 hPa, more particularly under the pressure of the surrounding atmosphere, in other words about 900 to 1100 hPa.

A further subject of the present invention are moldings produced by crosslinking the compositions of the invention.

The moldings of the invention are preferably coatings.

The compositions of the invention can be used for any purposes for which it is possible to use compositions that are storable with exclusion of water and crosslink to elastomers at room temperature when water is admitted.

The compositions of the invention are outstandingly suitable, for example, as coating materials for concrete, wood, steel, and aluminum. The coatings can be applied by brush or roller or else by spraying—by means of airless spray, for example. The sealing compounds in this case are applied preferably in layer thicknesses of 0.5 mm to 2 mm directly in one layer or else in two or more layers one above another. Furthermore, they can also be processed in a two-layer process with an inserted nonwoven web. The compositions can be used here horizontally or else vertically. The elastic protective coatings are particularly resistant to exposure to sunlight, rainwater, fresh water or salt water. The protective coatings, furthermore, are also of high thermal stability.

The compositions of the invention have the advantage that they are easy to produce and are distinguished by very high storage stability.

Furthermore, the compositions of the invention have the advantage that they have very good handling qualities during application and exhibit excellent processing properties across a plethora of applications.

Furthermore, the compositions of the invention have the advantage that they do not exhibit relatively high shrinkage rates on curing, especially as compared with formulations comprising solvents or other diluents.

The compositions of the invention have the advantage that they cure effectively even under different climatic conditions. The crosslinking, accordingly, is more independent of the ambient temperature and the atmospheric humidity. At the same time, the compositions of the invention with sufficient rapidity develop an internal strength (cohesion) which prevents the partially vulcanized compositions from rupturing or blistering as a result, for example, of shrinkage or of movements in the substrate, which would cause them to lose their sealing function.

Unless otherwise stated, the examples which follow are carried out at a pressure of the surrounding atmosphere, in other words approximately at 1000 hPa, and at room temperature, in other words at approximately 23° C., and/or at a temperature which comes about when the components are combined at room temperature without additional heating or cooling, and also at a relative atmospheric humidity of approximately 50%. Furthermore, all FIGURES for parts of percentages, unless otherwise stated, are by weight.

The skin-forming times are determined on foils applied in a thickness of 0.5 cm to 1 cm, by using a freshly sharpened pencil of hardness HB to contact the surface at a shallow angle at regular intervals. In this case, if material no longer remains hanging from the tip of the pencil when the pencil is slowly raised, and a fine skin lifts off, the time is recorded. After one day, the quality of the vulcanization is additionally examined on the basis of the tackiness of the surface and the tear strength of the vulcanizates (fingernail test).

The determination of viscosity and thixotropy is carried out on a rotary viscometer in accordance with DIN EN ISO 3219. First the viscosity is determined under a high shearing stress, and subsequently under a low shearing stress. Measurement takes place on a plate/cone system at 25° C., measuring element CP25/2. Preliminary conditioning is at 0.5 l/s for 1 min. It is followed by measurement at 25 l/s for 1 min and subsequently at 0.5 l/s for a further 1 min. Evaluation takes place via averaging from twenty measurement points.

The mechanical values were determined in accordance with ISO 37 on S2 specimens.

The Shore A hardness was determined in accordance with ISO 868.

Example 1

500 g of a polydimethylsiloxane with dimethoxyvinylsilyl end groups and of a viscosity of 8 000 mPa·s, 3.0 g of an octylphosphonic acid mixture composed of 25% by weight trimethoxymethylsilane and 75% by weight octylphosphonic acid, 20 g of vinyltriethoxysilane, and 15 g of N-aminoethylaminopropyltrimethoxysilane are homogenized in a laboratory planetary mixer for a duration of 3 minutes at about 300 rpm and a pressure of 200-300 hPa. Then 347 g of a ground, uncoated marble flour having an average particle size of 2 μm and 10 g of a hydrophilic, pyrogenic silica having a specific surface area of 150 m$^2$/g are mixed in slowly at a pressure of 900-1100 hPa and dispersed for 8 minutes at 800 rpm and a pressure of 200-300 hPa. The flowable mixture thus obtained is activated with 100 g of isooctyltriethoxysilane and 2.5 g of a tin catalyst, prepared by reaction of 1.4 g of di-n-butyltin oxide and 1.1 g of tetraethoxysilane, at 300 rpm and a pressure of 200-300 hPa for 3 minutes and stirred to remove bubbles.

A part of the composition thus produced was dispensed for keeping into cartridges and prior to the further tests was stored at 23° C. and 50% relative atmospheric humidity for 24 hours, and another part of the composition produced was dispensed into internally coated aluminum tubes and stored in a drying cabinet at 70° C. for 4 weeks.

The resulting compositions are thereafter investigated as described above for the skin-forming time and vulcanization. The surface is tested for tack by a simple test with the finger or the back of the index finger. If the finger detaches again without retardation, the evaluation is positive. The results are found in table 1.

Example 2

The procedure described in example 1 is repeated with the modification that instead of isooctyltriethoxysilane, 100 g of isooctyltrimethoxysilane are used.

The results are found in table 1.

Example 3

The procedure described in example 1 is repeated with the modification that instead of isooctyltriethoxysilane, 100 g of hexadecyltrimethoxysilane are used.

The results are found in table 1.

Comparative Example C1

The procedure described in example 1 is repeated, with the modification that instead of the isooctyltriethoxysilane, 100 g of isoparaffinic hydrocarbon (flash point>90° C., viscosity 3.5 cSt/25° C.) are used as solvent.

The results are found in table 1.

TABLE 1

| Example | 1 | 2 | 3 | C1 |
|---|---|---|---|---|
| Paste properties | | | | |
| SFT [min] after 24 h storage | 10 | 18 | 15 | 7 |
| SFT [min] after 4 weeks/70° C. storage | 13 | 22 | 20 | 10 |
| Surface after 24 h curing | positive | positive | positive | positive |
| Vulcanisate after 24 h curing | positive | slightly fragile | positive | positive |
| Viscosity/25° C. [mPa] | | | | |
| Shear rate 25 1/s | 8,000 | 7,500 | 8,500 | 8,000 |
| Shear rate 25 1/s | 27,000 | 26,000 | 27,000 | 34,000 |

SFT = skin-forming time

Example 4

500 g of a polydimethylsiloxane with dimethoxyvinylsilyl end groups and of a viscosity of 8 000 mPa·s, 3.0 g of an octylphosphonic acid mixture composed of 25% by weight trimethoxymethylsilane and 75% by weight octylphosphonic acid, 20 g of vinyltriethoxysilane, and 15 g of N-aminoethylaminopropyltrimethoxysilane are homogenized in a laboratory planetary mixer for 3 minutes at about 300 rpm and a pressure of 200-300 hPa. Then 347 g of a ground, uncoated marble flour having an average particle size of 2 μm and 10 g of a hydrophilic, pyrogenic silica having a specific surface area of 150 m²/g are mixed in slowly at a pressure of 900-1100 hPa and dispersed for 8 minutes at 800 rpm and a pressure of 200-300 hPa. The flowable mixture thus obtained is activated with 50 g of isooctyltriethoxysilane and 5.0 g of a tin catalyst, prepared by reaction of 0.9 g of di-n-octyltin oxide and 2.1 g of tetraethoxysilane, and 2.0 g of aminopropyltriethoxysilane at 300 rpm and a pressure of 200-300 hPa for 3 minutes and stirred to remove bubbles.

The composition thus produced was dispensed into cartridges as described in Example 1 and stored.

The resulting compositions are thereafter investigated as described above for the skin-forming time, vulcanization, and surface tackiness.

Furthermore, the compositions are crosslinked at 23° C. and 50% relative atmospheric humidity for 14 days, and the mechanical properties and Shore hardnesses are determined according to ISO 37 and ISO 868, respectively. The results are found in table 2.

Example 5

The procedure described in example 4 is repeated, with the modification that instead of 50 g of isooctyltriethoxysilane 100 g of isooctyltriethoxysilane are mixed in. The results are found in table 2.

Example 6

The procedure described in example 4 is repeated, with the modification that instead of 50 g of isooctyltriethoxysilane 200 g of isooctyltriethoxysilane are mixed in.

The results are found in table 2.

Comparative Example C2

The procedure described in example 4 is repeated, with the modification that no isooctyltriethoxysilane is mixed in.

The results are found in table 2.

Comparative Example C3

The procedure described in example 4 is repeated, with the modification that 100 g of tetraethoxysilane instead of the isooctyltriethoxysilane are mixed in with the catalyst. The results are found in table 2.

Comparative Example C4

The procedure described in example 4 is repeated, with the modification that 100 g of oligomerized tetraethoxysilane having an SiO₂ content of about 40 wt % are mixed in with the catalyst, instead of the isooctyltriethoxysilane.

The results are found in table 2.

TABLE 2

| Examples | 4 | 5 | 6 | C2 | C3 | C4 |
|---|---|---|---|---|---|---|
| Paste properties | | | | | | |
| SFT [min] after 24 h storage | 8 | 8 | 8 | 8 | 15 | 15 |
| Surface after 24 h curing | pos. | pos. | pos. | pos. | neg. tacky | neg. tacky |
| Vulcanisate after 24 h curing | pos. | pos. | pos. | pos. | neg. fragile | neg. not cured |
| Viscosity/25° C. [mPas] | | | | | | |
| Shear rate 25 1/s | 14,500 | 8,500 | 3,000 | 28,000 | 7,000 | 12,000 |
| Shear rate 25 1/s | 48,000 | 30,000 | 10,000 | 100,000 | 27,000 | 50,000 |

TABLE 2-continued

| Examples | 4 | 5 | 6 | C2 | C3 | C4 |
|---|---|---|---|---|---|---|
| Mechanical properties of foil to ISO 37-S2 | | | | | | |
| Shore A | 42 | 41 | 27 | 48 | 47 | n.m. |
| TS-MPa | 1.9 | 1.5 | 1.5 | 2.0 | 1.5 | n.m. |
| EB-% | 140 | 150 | 160 | 120 | 60 | n.m. |

SFT = skin-forming time
TS = tensile strength
EB = elongation at break
n.m. = not measurable

The invention claimed is:

1. A crosslinkable composition, comprising:
(A) organopolysiloxane(s) containing organyloxy groups and consisting of units of the formula (I)

$$R_a R^1_b (OR^2)_c SiO_{(4-a-b-c)/2} \quad (I),$$

where
R are identical or different and represent monovalent, SiC-bonded, optionally substituted hydrocarbyl radicals that are free from aliphatic carbon-carbon multiple bonds,
$R^1$ are identical or different and denote monovalent, SiC-bonded, optionally substituted hydrocarbyl radicals having aliphatic carbon-carbon multiple bonds,
$R^2$ are identical or different and denote monovalent, optionally substituted hydrocarbyl radicals, optionally interrupted by oxygen atoms,
a is 0, 1, 2 or 3,
b is 0 or 1, and
c is 0, 1, 2 or 3,
with the proviso that in formula (I) the sum a+b+c≤3 and c is other than 0 in at least one unit,
(B) organosilicon compound(s) of the formula (II)

$$(R^4O)_d SiR^3_{(4-d)} \quad (II),$$

where
$R^3$ are identical or different and denote monovalent, SiC-bonded, aliphatic hydrocarbyl radicals having 1 to 7 carbon atoms, that are optionally substituted by one or more of ether groups, ester groups, (poly)glycol radicals, triorganyloxysilyl groups, or aromatic radicals,
$R^4$ are identical or different and denote hydrogen or monovalent, optionally substituted hydrocarbyl radicals which are optionally interrupted by oxygen atoms, and
d is 2, 3 or 4,
and/or their partial hydrolysates,
(C) organosilicon compound(s) containing basic nitrogen, of the formula (III)

$$(R^6O)_e SiR^5_{(4-e)} \quad (III),$$

where
$R^5$ are identical or different and denote monovalent, SiC-bonded radicals containing basic nitrogen,
$R^6$ are identical or different and denote hydrogen or monovalent, optionally substituted hydrocarbyl radicals which are optionally interrupted by oxygen atoms,
e is 2 or 3,
and/or their partial hydrolysates, and
(D) organosilicon compound(s) of the formula (IV)

$$(R^8O)_h SiR^7_{(4-h)} \quad (IV),$$

where
$R^7$ are identical or different and denote monovalent, SiC-bonded, aliphatic hydrocarbyl radicals having at least 8 carbon atoms, optionally substituted by one or more of ether groups, ester groups, (poly)glycol radicals or triorganyloxysilyl groups,
$R^8$ are identical or different and denote hydrogen or monovalent, optionally substituted hydrocarbyl radicals which are optionally interrupted by oxygen atoms,
h is 2 or 3,
and/or their partial hydrolysates.

2. The crosslinkable composition of claim 1, wherein organopolysiloxanes (A) are substantially linear, organyloxyterminated organopolysiloxanes of the formula (V)

$$(OR^2)_{3-f} R^1_f Si-(SiR_2-O)_g-SiR^1_f (OR^2)_{3-f} \quad (V),$$

where
R, $R^1$ and $R^2$ are each identical or different, and have one of the definitions stated above,
g is 30 to 5000, and
f is 0, 1 or 2,
with the proviso that in formula (V) f is other than 0 in at least one unit.

3. The crosslinkable composition of claim 2, wherein organosilicon compound (D) has at least one radical $R^8$ having at least two carbon atoms.

4. The crosslinkable composition of claim 2, wherein at least one organosilicon compounds (D) is hexadecyltrimethoxysilane, hexadecyltriethoxysilane, n-octyltrimethoxysilane, n-octyltriethoxysilane, isooctyltrimethoxysilane or isooctyltriethoxysilane and/or their partial hydrolysates.

5. The crosslinkable composition of claim 1, wherein at least one organopolysiloxane (A) is
(MeO)2MeSiO[SiMe2O]200-2000SiMe(OMe)2,
(MeO)2MeSiO[SiMe2O]200-2000SiVi(OMe)2,
(MeO)2ViSiO[SiMe2O]200-2000SiVi(OMe)2,
(MeO)2MeSiO[SiMe2O]200-2000SiViMe(OMe),
(MeO)ViMeSiO[SiMe2O]200-2000SiViMe(OMe), or
(MeO)ViMeSiO[SiMe2O]200-2000SiVi(OMe)2.

6. The crosslinkable composition of claim 1, wherein organosilicon compound (D) has at least one radical $R^8$ having at least two carbon atoms.

7. The crosslinkable composition of claim 6, wherein at least one organosilicon compounds (D) is hexadecyltrimethoxysilane, hexadecyltriethoxysilane, n-octyltrimethoxysilane, n-octyltriethoxysilane, isooctyltrimethoxysilane or isooctyltriethoxysilane and/or their partial hydrolysates.

8. The crosslinkable composition of claim 1, wherein at least one organosilicon compounds (D) is hexadecyltrimethoxysilane, hexadecyltriethoxysilane, n-octyltrimethoxysilane, n-octyltriethoxysilane, isooctyltrimethoxysilane or isooctyltriethoxysilane and/or their partial hydrolysates.

9. The crosslinkable composition of claim 1, wherein the weight ratio of component (B) to component (C) is in the range from 2:1 to 1:2.

10. The crosslinkable composition of claim 1, which comprises:
(A) organopolysiloxanes consisting of units of the formula (I),
(B) organosilicon compounds of the formula (II) having at least one methyl or ethyl radical $R^4$ and/or their partial hydrolysates, (C) organosilicon compounds containing basic nitrogen and of the formula (III) and/or their partial hydrolysates,
(D) organosilicon compounds of the formula (IV) having at least one ethyl radical $R^8$ and/or their partial hydrolysates,
optionally (E) fillers,
optionally (F) catalysts,
optionally (G) stabilizers,
optionally (H) additives, and
optionally (J) plasticizers.

11. The crosslinkable composition of claim 1, which comprises:
(A) organopolysiloxanes of the formula (V),

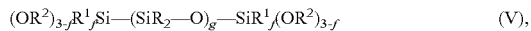
$$(OR^2)_{3-f}R^1_fSi-(SiR_2-O)_g-SiR^1_f(OR^2)_{3-f} \qquad (V),$$

R are identical or different and represent monovalent, SiC-bonded, optionally substituted hydrocarbyl radicals that are free from aliphatic carbon-carbon multiple bonds,
$R^1$ is a vinyl radical,
$R^2$ are identical or different and denote monovalent, optionally substituted hydrocarbyl radicals, optionally interrupted by oxygen atoms,
g is 30 to 5000,
f is 0, 1 or 2, and
with the proviso that in formula (V) f is other than 0 in at least one unit, (B) organosilicon compounds of the formula (II) having at least one methyl or ethyl radical $R^4$ and/or their partial hydrolysates,
(C) organosilicon compounds containing basic nitrogen and of the formula (III) selected from N-(2-aminoethyl)-3-aminopropyltrimethoxysilane and N-(2-aminoethyl)-3-aminopropyltriethoxysilane and their partial hydrolysates,
(D) organosilicon compounds of the formula (IV) having an alkyl radical $R^7$ having 8 to 16 carbon atoms and at least one ethyl radical $R^8$ and/or their partial hydrolysates,
optionally (E) fillers,
optionally (F) catalysts,
(G) stabilizers,
optionally (H) additives and
(J) plasticizers,
with the proviso that the weight ratio of component (B) to component (C) is in the range from 2:1 to 1:2.

12. A method for producing a crosslinkable composition of claim 1, comprising mixing all of the constituents with one another in any order.

13. A molding produced by crosslinking a composition prepared by the process of claim 12.

14. The molding of claim 13, which is a coating.

15. A molding produced by crosslinking a composition of claim 1.

16. The molding of claim 15, which is a coating.

* * * * *